(12) United States Patent
Sukoco et al.

(10) Patent No.: US 10,860,454 B2
(45) Date of Patent: *Dec. 8, 2020

(54) ANALYZING LARGE-SCALE DATA PROCESSING JOBS

(71) Applicant: Google LLC, Mountain View, CA (US)

(72) Inventors: Arif Sukoco, Sammamish, WA (US); Yesheng Li, Bellevue, WA (US); Ross Vincent Korsky, Auburn, WA (US); Loveena Sharma, Kirkland, WA (US); Carlos Alexandre Garcia de Souza, Marina Del Rey, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/708,897

(22) Filed: Dec. 10, 2019

(65) Prior Publication Data

US 2020/0117570 A1    Apr. 16, 2020

Related U.S. Application Data

(63) Continuation of application No. 15/432,375, filed on Feb. 14, 2017, now Pat. No. 10,514,993.

(51) Int. Cl.
*G06F 11/34*    (2006.01)
*G06F 9/48*     (2006.01)
*G06F 11/30*    (2006.01)

(52) U.S. Cl.
CPC ........ *G06F 11/3409* (2013.01); *G06F 9/4843* (2013.01); *G06F 11/3024* (2013.01); *G06F 11/3404* (2013.01); *G06F 11/3495* (2013.01)

(58) Field of Classification Search
CPC ............... G06F 9/4843; G06F 11/3024; G06F 11/3404; G06F 11/3409; G06F 11/3495

(Continued)

(56) References Cited

U.S. PATENT DOCUMENTS 8,041,707 B2    10/2011    Kitsuregawa
8,108,878 B1    1/2012     Pulsipher
(Continued)

OTHER PUBLICATIONS

Derek G. Murray, Malte Schwarzkopf, Christopher Snnowton, Steven Smith, Anil Madhavapeddy, and Steven Hand. 2011. CIEL: a universal execution engine for distributed data-flow computing. In Proceedings of the 8th USENIX conference on Networked systems design and implementation (NSDI'11) (Year: 2011).

(Continued)

*Primary Examiner* — Andrew M. Lyons
(74) *Attorney, Agent, or Firm* — Honigman LLP; Brett A. Krueger (57) ABSTRACT

Methods, systems, and apparatus for data analysis in a distributed computing system by accessing data stored at a first processing zone associated with a distributed data processing job, detecting information identifying a particular child job associated with the distributed data processing job, comparing the identifying information to data stored at a second processing zone, and identifying an additional child job as associated with the distributed data processing job based on a result of the comparison. The methods, systems and apparatus are further for correlating particular output data associated with the particular child job and additional output data associated with the additional child job for the distributed data processing job, determining performance data for the distributed data processing job based on the output data associated with each of the particular child job and the additional child job, and providing for display the performance data for the distributed data processing job.

20 Claims, 4 Drawing Sheets

(58) Field of Classification Search
USPC .......................................................... 718/100
See application file for complete search history.

(56) References Cited

U.S. PATENT DOCUMENTS

| | | |
|---|---|---|
| 9,172,608 B2 | 10/2015 | Zeyliger |
| 9,424,160 B2 | 8/2016 | Caufield |
| 9,684,689 B2 | 6/2017 | Arnady |
| 2002/0046273 A1 | 4/2002 | Lahr |
| 2003/0037177 A1 | 2/2003 | Sutton |
| 2003/0120710 A1 | 6/2003 | Pulsipher |
| 2004/0088386 A1 | 5/2004 | Aggarwal |
| 2004/0133395 A1 | 7/2004 | Ding et al. |
| 2005/0071842 A1 | 3/2005 | Shastry |
| 2006/0059489 A1 | 3/2006 | Koyanagi |
| 2011/0119680 A1 | 5/2011 | Li |
| 2011/0276966 A1 | 11/2011 | Christensen |
| 2011/0289507 A1 | 11/2011 | Khan |
| 2013/0204948 A1 | 8/2013 | Zeyliger et al. |
| 2013/0254196 A1 | 9/2013 | Babu et al. |
| 2013/0346988 A1 | 12/2013 | Bruno et al. |
| 2015/0127413 A1 | 5/2015 | Hanafusa |
| 2015/0160974 A1 | 6/2015 | Kishore |
| 2015/0163287 A1 | 6/2015 | Gooding |
| 2015/0205634 A1 | 7/2015 | McPherson |
| 2015/0269006 A1 | 9/2015 | Canfield et al. |
| 2015/0301861 A1 | 10/2015 | LaChiusa |
| 2015/0347193 A1 | 12/2015 | Wolfson |
| 2016/0011925 A1 | 1/2016 | Kulkarni et al. |
| 2016/0162819 A1* | 6/2016 | Hakman ............ G06Q 10/0633 705/7.27 |
| 2016/0170811 A1 | 6/2016 | Peacock |
| 2016/0239532 A1 | 8/2016 | Gould |
| 2016/0378554 A1* | 12/2016 | Gummaraju .......... G06F 9/5011 718/104 |
| 2018/0032373 A1 | 2/2018 | Chen |
| 2018/0123918 A1 | 5/2018 | Steinhauser |
| 2018/0173776 A1 | 6/2018 | Hock |
| 2018/0232295 A1 | 8/2018 | De Souza et al. |
| 2018/0349178 A1 | 12/2018 | Painter |

OTHER PUBLICATIONS

International Preliminary Report on Patentability issued in International Application No. PCT/US2017/057154, dated Jul. 16, 2018, 8 pages.
International Search Report and Written Opinion issued in International Application No. PCT/US2017/057154, dated Jan. 19, 2018, 21 pages.

* cited by examiner

ACCESS DATA, STORED AT A FIRST DATA CENTER, ASSOCIATED
WITH A DISTRIBUTED DATA PROCESSING JOB
410

DETECT IDENTIFYING INFORMATION OF A CHILD JOB
420

COMPARE IDENTIFYING INFORMATION TO DATA STORED AT A
SECOND DATA CENTER
430

IDENTIFYING ADDITIONAL CHILD JOB ASSOCIATED WITH THE
DISTRIBUTED DATA PROCESSING JOB
440

CORRELATE OUTPUT DATA ASSOCIATED WITH EACH OF THE
CHILD JOBS
450

DETERMINE PERFORMANCE DATA FOR THE DISTRIBUTED DATA
PROCESSING JOB
460

PROVIDE THE PERFORMANCE DATA FOR DISPLAY
470

FIG. 4

ANALYZING LARGE-SCALE DATA PROCESSING JOBS

CROSS-REFERENCE TO RELATED APPLICATION

This application is a continuation of U.S. application Ser. No. 15/432,375, filed Feb. 14, 2017, the contents of which are incorporated by reference herein.

BACKGROUND

Large scale data processing has become widespread in web companies and across industries. Large-scale data processing may include parallel processing, which generally involves performing some operation over each element of a large data set simultaneously. The various operations may be chained together in a data-parallel pipeline to create an efficient mechanism for processing a data set. Production of the data set may involve creation of child jobs or stages that execute for the main or parent job, where each child job may execute on different processing zones. Given the size of the large scale data processing jobs, however, it is difficult to analyze the performance of the large scale jobs.

SUMMARY

The present specification generally relates to large-scale data processing jobs.

Diagnosing anomalies in data processing pipelines may be difficult to achieve after the pipeline finishes running. Some of the challenges include missing logs, difficulty collating data across multiple runs, correlating information with other processing events, and determining a relationship between a main job and the stages or child jobs of that main job. There may be an array of relevant diagnostic information and analysis including pipelines failures, slowness, and performance metrics. Thus, there is a need for a data analyzing tool that enables collection of relevant information regarding a distributed data processing job and enables diagnosis of anomalies in data pipelines.

In general, one innovative aspect of the subject matter described in this specification can be embodied in methods that include the actions of accessing data, stored in a storage device of a first processing zone, that is associated with a particular distributed data processing job that has been executed; detecting, from the data stored in the storage device, identifying information that identifies a particular child job associated with the particular distributed data processing job; in response to detecting the identifying information that identifies a particular child job associated with the particular distributed data processing job, comparing the identifying information to data stored in a storage device of a second processing zone; identifying an additional child job as being associated with the particular distributed data processing job based on a result of comparing the identifying information to data stored in the storage device of the second processing zone; correlating particular output data associated with the particular child job and additional output data associated with the additional child job for the particular distributed data processing job; determining performance data for the particular distributed data processing job based on the particular output data associated with the particular child job and the additional output data associated with the additional child job; and providing for display the performance data for the particular distributed data processing job based on the particular output data associated with the particular child job and the additional output data associated with the additional child job.

In certain implementations, the methods further include the actions of comparing performance data for the particular distributed data processing job to a performance threshold; and providing a notification based on a result of comparing performance data for the particular distributed data processing job to the performance threshold.

In certain implementations, the notification comprises one or more of: an audible alert, a tactile alert, a visual alert, or an electronic message. In certain implementations, the performance data comprises one or more of: a running time, memory usage, CPU time, disk usage, a relationship between each child job and the particular distributed data processing job, one or more counters associated with the particular distributed data processing job, or a processing status.

In certain implementations, the methods further include the actions of displaying a user interface that includes display of the performance data, wherein the user interface comprises an interactive hierarchical structure.

In certain implementations, the identifying information comprises a common prefix identified in the data.

In certain implementations, the particular distributed data processing job is associated with a particular pipeline; and correlating particular output data associated with the particular child job and additional output data associated with the additional child job for the particular distributed data processing job comprises associating the particular child job and the additional child job with the particular pipeline; and the methods include the actions of: determining pipeline performance data for a first run of the particular pipeline; and determining pipeline performance data for a second run of the particular pipeline.

Other realizations of the above aspects include corresponding systems, apparatus, and computer programs, configured to perform the actions of the methods, encoded on computer storage devices.

Particular implementations of the subject matter described in this specification can be implemented so as to realize one or more of the following advantages. The systems and methods allow for a mechanism to reliably and accurately analyze the correctness and performance of large-scale data processing jobs. The systems and methods realized an intuitive data analysis tool that enables the diagnosing of pipeline flow errors and pipeline accuracy more quickly and accurately than in systems that do not implement these systems and methods. This allows for remedial actions to be more focused and efficient, which saves both time and system resources. Further, implementations of the present disclosure achieve technical advantages such as identifying child job data related to a main job when the child job data is stored across processing zones, automated collection and correlation of child job data stored across processing zones, more efficient and faster processing for the collection and correlation of performance data, automated notifications or alerts regarding job performance metrics, and analysis and diagnosis of job performance including an intuitive user interface. In particular, implementations of the present disclosure achieve the technical advantage of more easily identifying root causes of performance degradation and identifying stages that use more resources over different runs.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

At a high level, implementations of the present disclosure provide an offline pipeline analysis and diagnosis framework, which collects and organizes relevant data related to distributed data processing pipelines stored across different processing zones. In addition, the data is correlated and presented in a more structured form to the user and may provide automated notification regarding certain performance metrics. Some example performance analysis includes, but is not limited to: the number of times the pipeline ran in the last n amount of time and the corresponding status, run times for different stages or different phases of the data processing job, variations in counters across different runs of the pipeline, the number of unique failures encountered for a given pipeline and any existing bugs, a change in processing environment for the pipeline such as grouping, scheduling, strategy across different runs of the pipeline, and other transient issues that may affect the pipeline. One example of a distributed data processing job is a MapReduce job that may include map, shuffle, and reduce phases. However, other distributed processing systems may also benefit from implementations of the present disclosure.

These features and additional features are described in more detail below.

Figure 1:
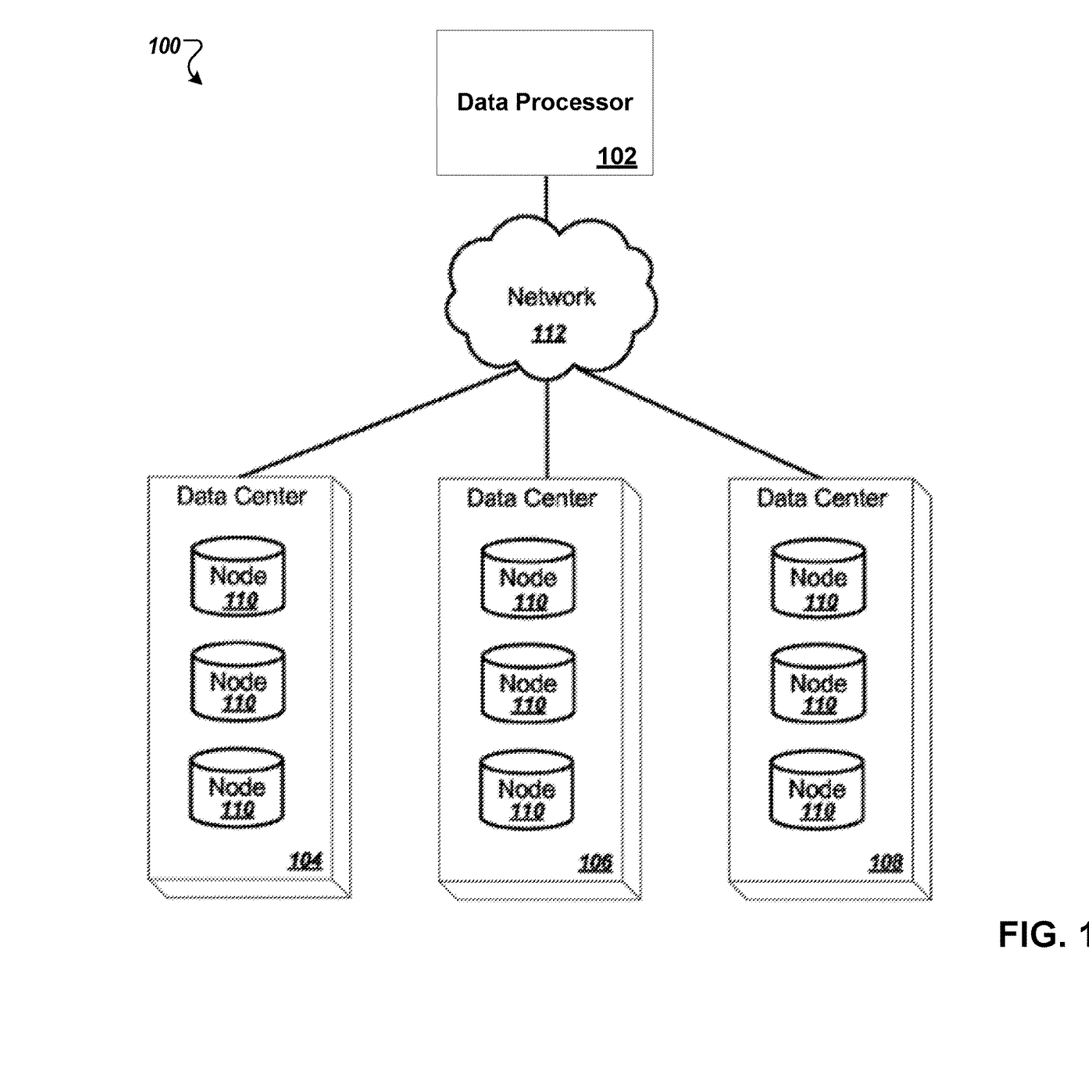
FIG. 1 depicts an example of a distributed data processing system, according to implementations of the present disclosure.

FIG. 1 depicts an example of a distributed data processing system 100, according to implementations of the present disclosure. The distributed data processing system 100 may include a data processor 102, which may include one or more computers. The data processor 102 may store data, for example, across storage nodes 110 at processing zones 104, 106, and 108. Conventional processing zones can store large amounts of data. Some data is stored redundantly across multiple processing zones so that even if an entire processing zone fails the data can be recovered. The data processor 102 may communicate with the processing zones 104, 106, and 108 using a network 112.

A storage node may include one or more computer storage mediums. In some implementations, a storage node is a data server, for example, a server including a data processing apparatus and multiple hard disk drives on which data can be stored. A group of storage nodes may include a rack, a subnetwork, a processing zone, or various other collections of servers or storage nodes.

A processing zone may include a grouping of storage nodes. A processing zone is designed to be relatively independent from other processing zones. For example, a processing zone may have independent resources, such as power, networking, environmental controls, security, or the like, or any combination thereof. Processing zones may include, for example, networking systems, backup power supplies, climate controls, security, or the like, or any combination thereof. A processing zone may comprise or be limited to a single facility or building or one or more facilities, or in some instances may comprise or be limited to a portion of a single facility. In FIG. 1, the processing zones 104, 106, and 108 are shown with three storage nodes; however, each processing zone can have more or fewer storage nodes. Data may be stored in data chunks, each data chunk including a specified amount of data. In some implementations, a data chunk may be a contiguous portion of data from a file. In some other implementations, a data chunk may be one or more non-contiguous portions of data from a file. In some implementations, metadata is used at the processing zones 104, 106, and 108 to keep track of stored data. For example, the metadata may specify which parts of a file are stored at which processing zones. In addition, data chunks may be specified to be stored at certain processing zones. For example, data may be specified to be stored at a processing zone based on the processing zone's geographic location.

In a distributed data processing system, for example distributed data processing system 100 of FIG. 1, a particular distributed data processing job may include a main job that creates multiple child jobs, which may span multiple processing zones 104, 106, and 108. These jobs may be referred to as batch jobs. Because the child jobs span multiple processing zones, accessing the data at different locations is difficult with conventional systems and processes. In particular, it may not be possible to obtain consolidated data for the entire job to provide accurate performance analysis and diagnostics with these conventional systems and processes. In particular, for example, the metadata described above may be lost or deleted once a distributed data processing job is completed. Thus, a correlation between various child jobs and the main job may be difficult to ascertain.

For example, in a typical MapReduce system, the MapReduce framework will automatically split the job into multiple child jobs, sometimes executed in parallel. The relationships between the main job and child jobs are not readily attainable, especially for a job that has terminated. Further, for example, it is difficult to track and correlate counters regarding the number of objects and operations the MapReduce job is processing, which serve as indicators of the job's behavior and to help with debugging the job, as well as information about the code version used to build the MapReduce job binary. In addition, for example, a MapReduce job as part of a large scale data processing MapReduce system is typically run on a regular basis, but it is difficult to view the relative performance of the same job over time, for example when changes are introduced to the MapReduce system as part of the development process. Moreover, it is difficult to obtain information regarding the MapReduce job's interaction with the distributed runtime environment. However, implementations of the present disclosure enable each of these difficulties or challenges to be overcome, thereby providing the associated functionality for the performance and diagnosis of a large-scale data processing system, as described in more detail below.

Implementations of the present disclosure provide a manner for collecting and correlating relevant information regarding each of the child jobs, determining a relationship between respective child jobs and the main job, determining how different jobs are executing relative to each other, and enabling developers to identify which stage or phase is executed in each job, even when the data is stored across different processing zones. In addition, implementations of the present disclosure may collect and group data relevant to different runs of the same pipeline to provide enhanced diagnostic and analysis capabilities. For example, as described in more detail below, a footprint or pattern may be determined from data associated with a distributed data processing job that may be used to identify child jobs stored across different processing zones as being associated with the main job. For example, the footprint or pattern may comprise a common prefix that uniquely identifies child jobs associated with the main job. In this manner, data associated with child jobs may be identified and correlated with each other and with the main job, and from that data, performance information may be determined.

Figure 2:
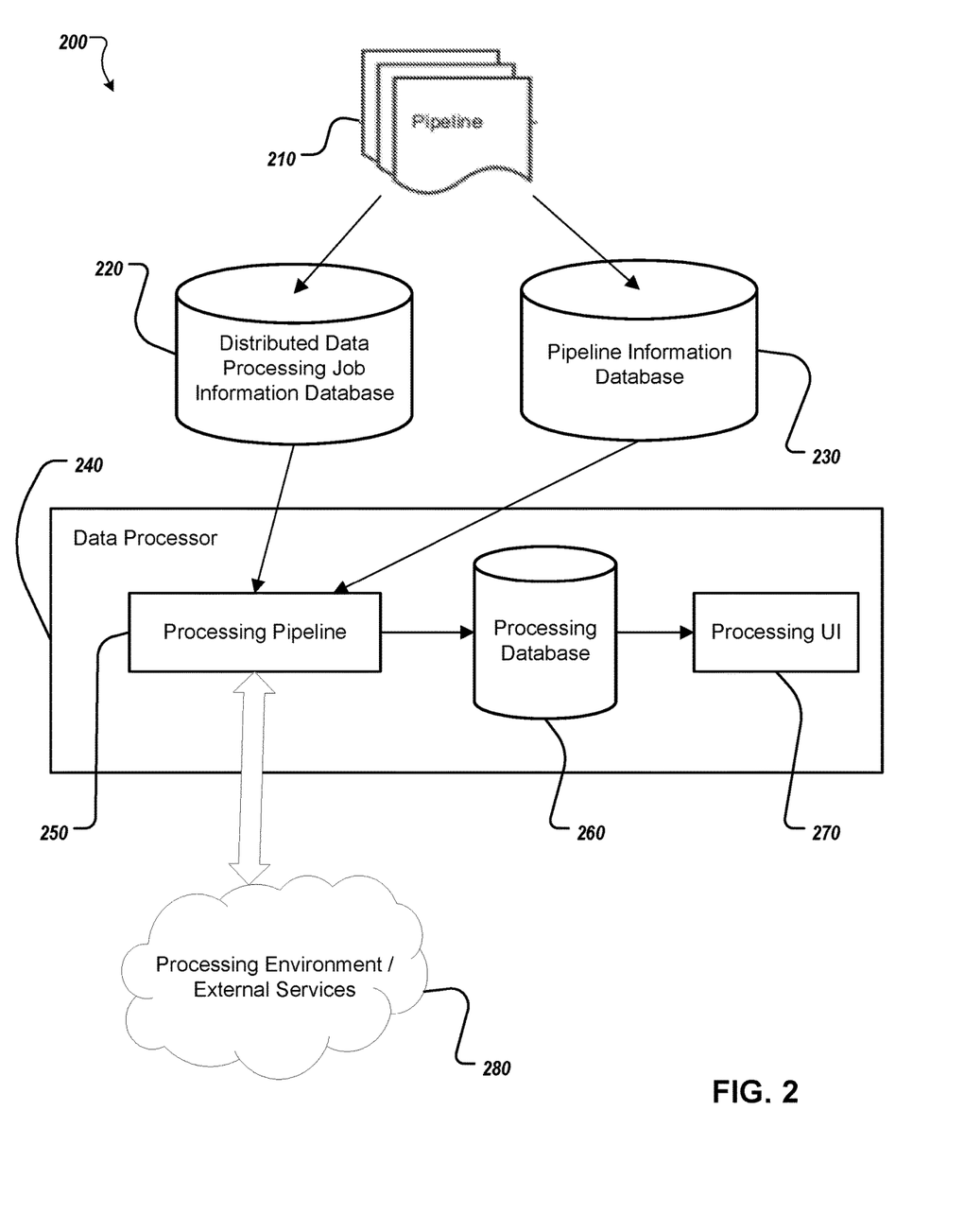
FIG. 2 depicts an example of a system for analyzing data of a distributed data processing system, according to implementations of the present disclosure.

FIG. 2 depicts an example of a system 200 for analyzing data of a distributed data processing system, according to implementations of the present disclosure. As an example of distributed data processing, a processing pipeline 210 is depicted in FIG. 2. The pipeline 210 may communicate with and store data in one or both of a distributed data processing job information database 220 and a pipeline information database 230. As described above, these databases may be stored in storage devices across processing zones. For example, a portion of data associated with pipeline 210 may be stored at one processing zone and another portion of data associated with pipeline 210 may be stored at another processing zone. Further, for example, each of those portions of data may be associated with a respective child job of the pipeline 210.

Data from one or both of the distributed data processing job information database 220 and the pipeline information database 230 may be accessed by data processor 240. One of the main functions for data processor 240 is a data collection and processing pipeline 250 which collects and processes all the pipeline relevant information and writes that data to processing database 260. The data collection and processing pipeline 250 may collect information from a number of sources, including the distributed data processing job information database 220 and the pipeline information database 230, which may be accessed by data processor 240. In addition, the data collection and processing pipeline 250 may collect information from external services and the processing environment 280. The processing user interface (UI) 270 provides information for display from the data collected and processed by the data collection and processing pipeline 250 that is stored in the processing database 260.

The processing pipeline 250 may collect information related to each job from multiple sources, including log files, log databases, event logs, and runtime environment settings, which may then be presented on the processing UI 270. For example, the processing pipeline 250 may collect information at a predetermined time interval. The information identified and collected by processing pipeline 250 may be stored in processing database 260. That data may also be optimized for combining with other data before or after being stored to enable more efficient processing of the data for presentation on the processing UI 270.

Some examples of the type of information that processing pipeline 250 may collect include, but are not limited to: the running time of each job; the memory usage, CPU time, and disk usage for each run of a job; information regarding each stage or phase of the job for each run of the job; time elapsed for each stage or phase, along with memory usage, CPU time, and disk usage of each stage or phase; a "parent-child" relationship between the main job and the child jobs or stages, which may be collected and reconstructed from the log files and log databases into which the system writes logging information; any counter information logged in each stage or phase, which may be collected from log files or databases, or from a different database where the counter information may be stored due to its large volume.

The processing UI 270, for display of the performance information determined by processing pipeline 250, may be structured in a manner to enable a user to selectively view different levels of detail for the information associated with the job. For example, the processing UI 270 may include a hierarchy of information displayed so that a user may selectively view higher level information about the system or job, and make a selection to view more detailed information about the system or job or about a portion of the system or job. This interactive hierarchy of information to be displayed is described in more detail with reference to FIG. 3, showing an example of a processing UI, which has been described above.

Figure 3:
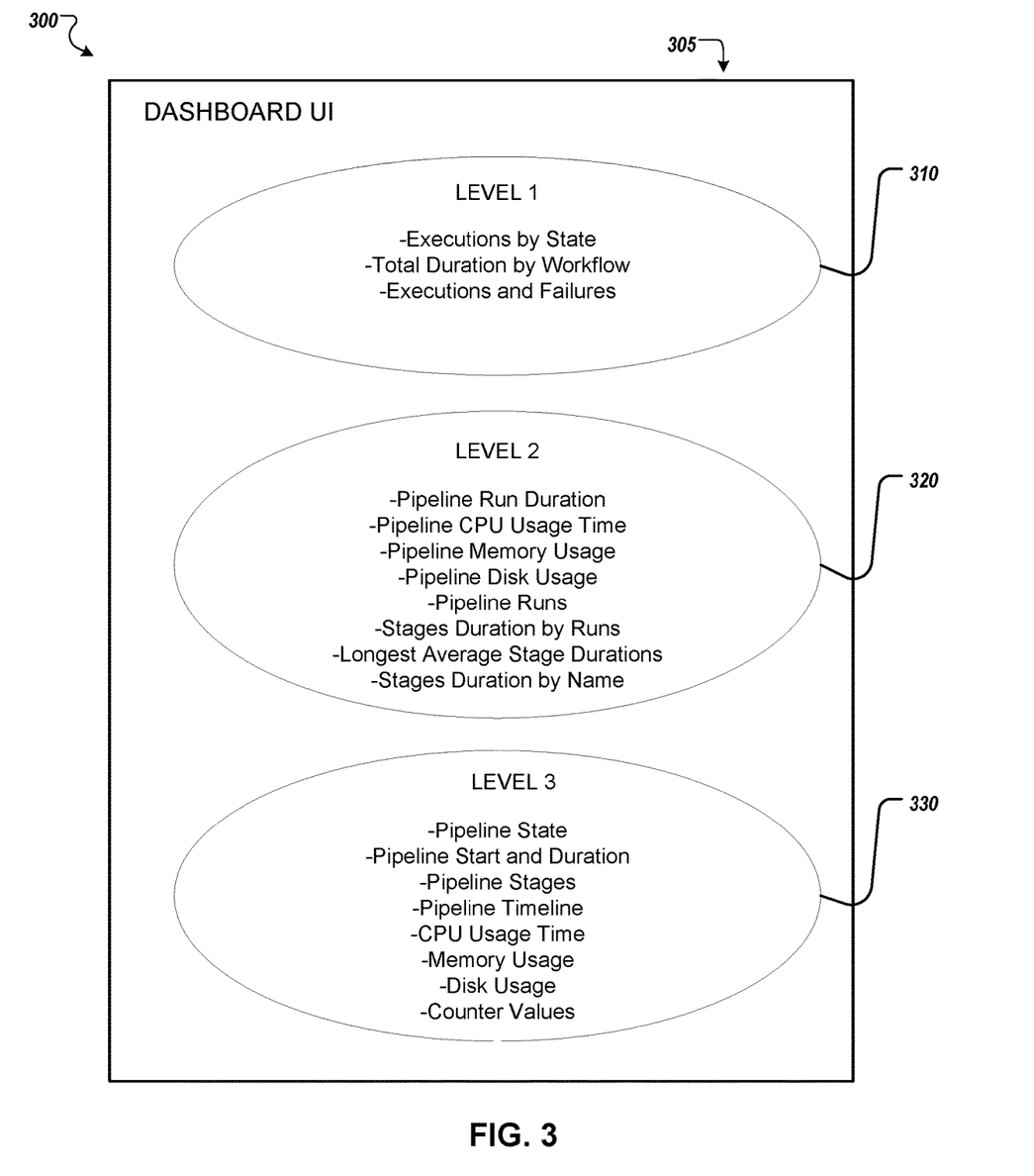
FIG. 3 depicts an example of a processing user interface, according to implementations of the present disclosure.

FIG. 3 depicts an example of a processing UI 300, according to implementations of the present disclosure. For example, the processing UI 300 may include a dashboard UI 305. The dashboard UI 305 may include an interactive hierarchy of levels of information that allow a user to selectively drill down into the job's detailed information. This processing UI 300 enables a user to more easily observe the status of all of the runs of a particular job, compare different runs, compare different jobs, or the like, or any combination thereof.

For example, the first level UI 310 may display all the distinct jobs associated with a user or that the user has selected to be displayed. The first level UI 310 may also display the overall number of jobs that have passed and failed in a particular timeframe. Further, for example, the first level UI may display a number of executions by state and a total duration by workflow. As part of the processing UI 300, a user may select each distinct job, which may provide a display of the next level of information, the second level UI 320.

The second level UI 320 may display historical data regarding elapsed time and resources consumed by runs of a particular job over a particular timeframe. The second level UI 320 may also display any number of the following performance metrics: pipeline run duration, pipeline CPU usage time, pipeline memory usage, pipeline disk usage, instances or number of pipeline runs, stage duration by run, a list of the n longest average stage durations, and a list of stage duration by name. Further, for example, as a list of the instances of past job runs may be presented on the second level UI 320, a user may select any of those instances, which may provide a display of the next level of information, the third level UI 330.

The third level UI 330 may display information regarding one specific run instance of the job. For example, the third level UI 330 may display information regarding running time, CPU usage time, memory usage, and disk usage of each stage within the job as well as the binary build version for the job. The third level UI 330 may also display pipeline states, a pipeline start time and duration, pipeline stages, and counter values associated with the instance of the job. In addition, a timeline of each stage's start and stop may be displayed on the third level UI 330.

As another feature of the second level UI 320, a user may select two different runs from those displayed and select to compare these runs with each other. For example, that selection may cause a comparison UI to be displayed, in which information regarding the two selected runs is displayed side-by-side for easier comparison. The comparison UI may be part of the second level UI 320 or may be a separate UI displayed within processing UI 300.

Figure 4:
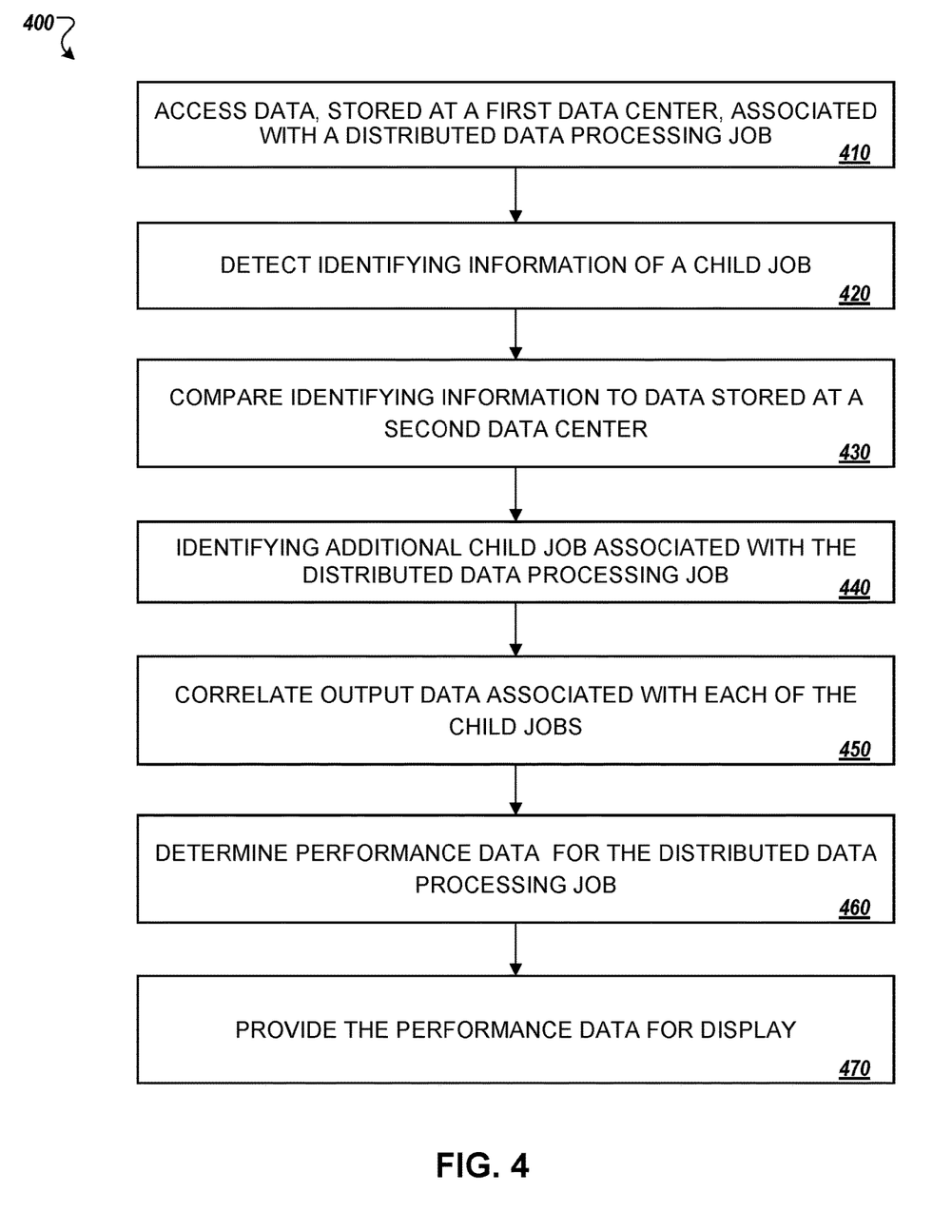
FIG. 4 depicts a flowchart of an example of a process for analyzing data in a distributed data processing system, according to implementations of the present disclosure.

FIG. 4 depicts a flowchart of an example of a process 400 for data analysis in a distributed data processing system, according to implementations of the present disclosure. Although process 400 is depicted and described with steps occurring in a particular order, one or more of those steps may occur in a different order than what is depicted and described.

Once a large-scale data processing job is completed, information related to the job may be stored across different processing zones and difficult to identify, extract, and analyze. According to implementations of the present disclosure, data stored in one or more storage devices at a first processing zone may be accessed at 410. The data accessed at 410 may be data associated with a particular distributed data processing job that has been executed.

At 420, identifying information that identifies a particular child job associated with the particular distributed data processing job may be detected from data stored in a storage device at the first processing zone. The identifying information may include a pattern that uniquely identifies a child job associated with the particular distributed data processing job. For example, the pattern may be a common prefix identified in the data that may be common to other child jobs associated with the particular distributed data processing job.

In response to detecting the identifying information that identifies a particular child job associated with the particular distributed data processing job, the identifying information may be compared to data stored in a storage device of a second processing zone at 430. Like the first processing zone, the second processing zone may include one or more storage devices on which data regarding one or more child jobs is stored. At 440, an additional child job may be identified as being associated with the particular distributed data processing job based on a result of the comparison between the identifying information that identifies a particular child job associated with the particular distributed data processing job and the data stored in the storage device of the second processing zone.

At 450, particular output data associated with the particular child job may be correlated with additional output data associated with the additional child job for the particular distributed data processing job. For example, one or more relationships between child jobs and respective relationships between each child job and the main job may be determined.

Further, at 460, performance data for the particular distributed data processing job may be determined based on the particular output data associated with the particular child job and the additional output data associated with the additional child job. The performance data may include: a running time, memory usage, CPU time, disk usage, a relationship between each child job and the particular distributed data processing job, one or more counters associated with the particular distributed data processing job, a processing status, or the like, or any combination thereof.

Once the performance data for the particular distributed data processing job is determined, that performance data may be provided for display, at 470, based on the particular output data associated with the particular child job and the additional output data associated with the additional child job. For example, various performance information and metrics may be calculated from the collected data and may be displayed on an interactive UI. Further, for example, performance data for the particular distributed data processing job may be compared to a performance threshold, and a notification may be provided based on a result of the comparison of the performance data for the particular distributed data processing job to the performance threshold. For example, the notification may include an audible alert, a tactile alert, a visual alert, an electronic message, or the like, or any combination thereof.

As noted above, the performance data provided for display at 270 may be provided via an UI that includes display of the performance data. The UI may include an interactive hierarchical structure. In that manner, the UI may selectively display varying levels of detail or information regarding different jobs, different runs of a pipeline, different child jobs, or the like, based on a user's selection. For example, as described above with reference to FIG. 3, the UI may include different hierarchical levels of display with which a user may interact and which may be selectively displayed based on the type of information the user desires.

In implementations of the present disclosure, the particular distributed data processing job may be associated with a particular distributed data processing pipeline. Thus, for example, correlating particular output data associated with the particular child job and additional output data associated with the additional child job for the particular distributed data processing job may include associating the particular child job and the additional child job with the particular pipeline. In addition, for example, pipeline performance data may be determined for a first run of the particular pipeline, and pipeline performance data may be determined for a second run of the particular pipeline.

Thus, a comparison may be made between different runs of a particular pipeline, and the performance data may be provided on the UI such that the different runs of the particular pipeline may be compared side-by-side. Accordingly, a user may more easily identify discrepancies, latencies, differences in resource consumption, or the like, or any combination thereof. Identifying the relationship between different runs of the same pipeline enables the comparison to be made, which provides a more efficient diagnosis of issues for the distributed data processing pipeline.

Thus, implementations of the present disclosure achieve technical advantages such as identifying child job data related to a main job when the child job data is stored across processing zones, automated collection and correlation of child job data stored across processing zones, more efficient and faster processing for the collection and correlation of performance data, automated notifications or alerts regarding job performance metrics, and analysis and diagnosis of job performance including an intuitive user interface. Further, certain advantages and technical effects of implementations of the present disclosure include an interactive UI for a user to observe the status of all job runs, the ability to compare two job runs side-by-side to more easily investigate possible root causes of any performance degradation in the job, automatically identifying a job that decreases in performance over time, and identifying stages within a job that are taking the longest time to run or consuming the most computing resources. Thus, deficiencies or problems in a distributed data processing job may be more easily and quickly diagnosed and corrected, thereby decreasing processing time and improving performance of the distributed data processing system.

A number of implementations have been described. Nevertheless, it will be understood that various modifications may be made without departing from the spirit and scope of the disclosure. For example, various forms of the flows shown above may be used, with steps re-ordered, added, or removed.

Implementations of the invention and all of the functional operations described in this specification can be implemented in digital electronic circuitry, or in computer software, firmware, or hardware, including the structures disclosed in this specification and their structural equivalents, or in combinations of one or more of them. Implementations of the invention can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

While this disclosure contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for data analysis in a distributed computing system, the method comprising:

accessing data, stored in a storage device of a first processing zone, that is associated with a particular child job created from a particular distributed data processing job that has been executed;

detecting, from the data stored in the storage device, identifying information that identifies the particular child job created from the particular distributed data processing job;

in response to detecting the identifying information that identifies the particular child job created from the particular distributed data processing job, determining that the identifying information that identifies the particular child job and second identifying information stored in a storage device of a second processing zone share a common prefix;

in response to determining that the identifying information that identifies the particular child job and the second identifying information stored in the storage device of the second processing zone share a common prefix, identifying an additional child job as being created from the particular distributed data processing job;

correlating particular output data associated with the particular child job and additional output data associated with the additional child job created from the particular distributed data processing job;

determining performance data for the particular distributed data processing job based on the particular output data associated with the particular child job and the additional output data associated with the additional child job;

determining that the performance data satisfies performance criteria; and in response to determining that the performance data satisfies the performance criteria, triggering an action to be performed.

2. The method of claim 1, wherein determining that the performance data satisfies performance criteria comprises:

comparing the performance data to a performance threshold.

3. The method of claim 1, wherein triggering an action to be performed comprises:

providing a notification based on a result of comparing performance data for the particular distributed data processing job to the performance criteria.

4. The method of claim 3, wherein the notification comprises one or more of: an audible alert, a tactile alert, a visual alert, or an electronic message.

5. The method of claim 1, wherein the performance data comprises one or more of: a running time, memory usage, CPU time, disk usage, a relationship between each child job and the particular distributed data processing job, one or more counters associated with the particular distributed data processing job, or a processing status.

6. The method of claim 1, further comprising:

displaying a user interface that includes display of the performance data, wherein the user interface comprises an interactive hierarchical structure.

7. The method of claim 1,
wherein the particular distributed data processing job is associated with a particular pipeline;
wherein correlating particular output data associated with the particular child job and additional output data associated with the additional child job for the particular distributed data processing job comprises associating the particular child job and the additional child job with the particular pipeline; and
the method further comprising:
determining pipeline performance data for a first run of the particular pipeline; and
determining pipeline performance data for a second run of the particular pipeline.

8. A system for data analysis in a distributed computing system comprising:
one or more computers and one or more storage devices storing instructions that are operable, when executed by the one or more computers, to cause the one or more computers to perform operations comprising:
accessing data, stored in a storage device of a first processing zone, that is associated with a particular child job created from a particular distributed data processing job that has been executed;
detecting, from the data stored in the storage device, identifying information that identifies the particular child job created from the particular distributed data processing job;
in response to detecting the identifying information that identifies the particular child job created from the particular distributed data processing job, determining that the identifying information that identifies the particular child job and second identifying information stored in a storage device of a second processing zone share a common prefix;
in response to determining that the identifying information that identifies the particular child job and the second identifying information stored in the storage device of the second processing zone share a common prefix, identifying an additional child job as being created from the particular distributed data processing job;
correlating particular output data associated with the particular child job and additional output data associated with the additional child job created from the particular distributed data processing job;
determining performance data for the particular distributed data processing job based on the particular output data associated with the particular child job and the additional output data associated with the additional child job;
determining that the performance data satisfies performance criteria; and
in response to determining that the performance data satisfies the performance criteria, triggering an action to be performed.

9. The system of claim 8, wherein determining that the performance data satisfies performance criteria comprises:
comparing the performance data to a performance threshold.

10. The system of claim 8, wherein triggering an action to be performed comprises:
providing a notification based on a result of comparing performance data for the particular distributed data processing job to the performance criteria.

11. The system of claim 10, wherein the notification comprises one or more of: an audible alert, a tactile alert, a visual alert, or an electronic message.

12. The system of claim 8, wherein the performance data comprises one or more of: a running time, memory usage, CPU time, disk usage, a relationship between each child job and the particular distributed data processing job, one or more counters associated with the particular distributed data processing job, or a processing status.

13. The system of claim 8, the operations further comprising:
displaying a user interface that includes display of the performance data,
wherein the user interface comprises an interactive hierarchical structure.

14. The system of claim 8,
wherein the particular distributed data processing job is associated with a particular pipeline;
wherein correlating particular output data associated with the particular child job and additional output data associated with the additional child job for the particular distributed data processing job comprises associating the particular child job and the additional child job with the particular pipeline; and
the operations further comprising:
determining pipeline performance data for a first run of the particular pipeline; and
determining pipeline performance data for a second run of the particular pipeline.

15. A non-transitory computer-readable medium storing software, for data analysis in a distributed computing system, comprising instructions executable by one or more computers which, upon such execution, cause the one or more computers to perform operations comprising:
accessing data, stored in a storage device of a first processing zone, that is associated with a particular child job created from a particular distributed data processing job that has been executed;
detecting, from the data stored in the storage device, identifying information that identifies the particular child job created from the particular distributed data processing job;
in response to detecting the identifying information that identifies the particular child job created from the particular distributed data processing job, determining that the identifying information that identifies the particular child job and second identifying information stored in a storage device of a second processing zone share a common prefix;
in response to determining that the identifying information that identifies the particular child job and the second identifying information stored in the storage device of the second processing zone share a common prefix, identifying an additional child job as being created from the particular distributed data processing job;
correlating particular output data associated with the particular child job and additional output data associated with the additional child job created from the particular distributed data processing job;
determining performance data for the particular distributed data processing job based on the particular output data associated with the particular child job and the additional output data associated with the additional child job;
determining that the performance data satisfies performance criteria; and in response to determining that the performance data satisfies the performance criteria, triggering an action to be performed.

16. The medium of claim 15, wherein determining that the performance data satisfies performance criteria comprises:
comparing the performance data to a performance threshold.

17. The medium of claim 15, wherein triggering an action to be performed comprises:
providing a notification based on a result of comparing performance data for the particular distributed data processing job to the performance criteria.

18. The medium of claim 17, wherein the notification comprises one or more of: an audible alert, a tactile alert, a visual alert, or an electronic message.

19. The medium of claim 15, wherein the performance data comprises one or more of: a running time, memory usage, CPU time, disk usage, a relationship between each child job and the particular distributed data processing job, one or more counters associated with the particular distributed data processing job, or a processing status.

20. The medium of claim 15, the operations further comprising:
displaying a user interface that includes display of the performance data,
wherein the user interface comprises an interactive hierarchical structure.

* * * * *